Dec. 24, 1957 W. R. KOCH 2,817,755

AUTOMATIC FREQUENCY CONTROL CIRCUITS

Filed Aug. 31, 1953 2 Sheets-Sheet 1

INVENTOR.
Winfield R. Koch

BY [signature]
ATTORNEY

Dec. 24, 1957 W. R. KOCH 2,817,755

AUTOMATIC FREQUENCY CONTROL CIRCUITS

Filed Aug. 31, 1953 2 Sheets-Sheet 2

INVENTOR.
Winfield R. Koch

BY Olin Mitchell
ATTORNEY

United States Patent Office 2,817,755 Patented Dec. 24, 1957

2,817,755

AUTOMATIC FREQUENCY CONTROL CIRCUITS

Winfield R. Koch, Marlton, N. J., assignor to Radio Corporation of America, a corporation of Delaware Application August 31, 1953, Serial No. 377,486

12 Claims. (Cl. 250—20)

The present invention relates to new and improved automatic frequency control (A. F. C.) circuits and, more particularly, although not necessarily exclusively, to circuitry suitable for maintaining the frequency of a local oscillator in a superheterodyne receiver at its desired value.

In a superheterodyne television receiver, for example, the received amplitude-modulated picture carrier wave is heterodyned or "beat" with a locally produced frequency in order to reduce the carrier to an intermediate frequency (I. F.) which is amplified and detected. Since it is preferable for the frequency of the local oscillator which furnishes the heterodyning wave to be accurate, some means for controlling frequency is desirable. Thus, there have been many proposals for A. F. C. circuits employing various types of frequency discriminating arrangements for detecting a departure of the intermediate frequency from its proper value. These have, in general, required the inclusion of some form of discriminator having a plurality of tuned circuits for discerning frequency changes and have, therefore, greatly complicated the receiver, thereby increasing costs.

It is, therefore, a primary object of the present invention to provide new and improved automatic frequency control means for an oscillator, which means are simple and require the addition of only a single tuned circuit and a reactance tube device to the conventional circuitry of a receiver.

Since, in present-day television practice, it is customary to employ intermediate frequency circuits having a response characteristic of such shape that the video carrier is located at the 50 percent amplitude point on its sloped portion, it has been found by the present applicant that the I. F. stage itself may be advantageously utilized as one part of a well known, double tuned circuit frequency discriminator such as that described in U. S. Patent 2,051,640 granted October 13, 1936, to F. Conrad.

Thus, it is another object of the invention to provide automatic frequency control means for a television receiver, for example, which utilizes the sloping portion of the I. F. response characteristic of the receiver as part of its frequency discrimination.

In general, the present invention provides an amplifier coupled to the input of the usual second detector or video detector of a receiver, the anode circuit of the amplifier having an L–C circuit tuned to a specific frequency and with a certain response curve such that its product with the I. F. response curve results in a response curve which intersects the I. F. characteristic curve at the precise location of the picture carrier wave frequency. The output of this tuned circuit is coupled to a diode rectifier which has a load resistance in series opposition with a similar resistor in the output of the video detector, thus furnishing a frequency discriminator. Frequency discriminators are now well known in the art and are well described in the textbook "Frequency Modulation" by N. Marchand, Murray-Hill Book Co., Inc., New York, 1948, page 185.

In accordance with another aspect of the invention a gated A. F. C. arrangement is provided, again utilizing the described I. F. response characteristic of the receiver as one part of a double tuned circuit frequency discriminator. The latter arrangement is particularly suitable for noise-immune operation, since it may be operated during only synchronization periods, when signal amplitude is large and substantially above noise disturbances and is advantageous in that it is less subject to the effects of picture content.

Another use for which the latter type of circuit is extremely well suited is that of maintaining substantially constant the frequency of oscillation of a color reference oscillator such as is employed in a color television receiver. That is to say, one proposed color television system transmits color information by means of a phase-and-amplitude-modulated color subcarrier wave. At the receiver, a phase discriminator or demodulating arrangement detects the instantaneous phase of the received subcarrier wave as an indication of the hue of the image color. Ordinarily, the color demodulating circuits are furnished with the several phases of a wave of subcarrier frequency by means of a delay line fed by a color reference oscillator. Synchronization of such oscillator is afforded by means of "bursts" of sub-carrier frequency energy occurring after each horizontal synchronizing pulse. By gating the frequency discriminator of the present invention during the occurrence of the "bursts," automatic frequency control of the color reference oscillator may be obtained in a simple, yet extremely effective, manner. This is made possible by the fact that the color sub-carrier is normally located according to a proposed system at the 50 percent amplitude point on the other side of the I. F. response curve from the picture carrier, and, since the curve is more steeply sloped at the location of the color carrier, an even more precise A. F. C. action is possible. It will, therefore, be appreciated that the present invention provides excellent A. F. C. action for either the superheterodyne local oscillator or the color reference oscillator of a television receiver.

Additional objects and advantages of the present invention will become apparent to persons skilled in the art from a study of the following detailed description of the accompanying drawings, in which:

Fig. 1 illustrates an idealized I. F. characteristic curve for a television receiver;

Fig. 2 comprises several resonance curves to be described in the explanation of the invention.

Fig. 3 (*a*) is a schematic diagram of a conventional oscillator and frequency control device;

Figures 4, 5, 6:
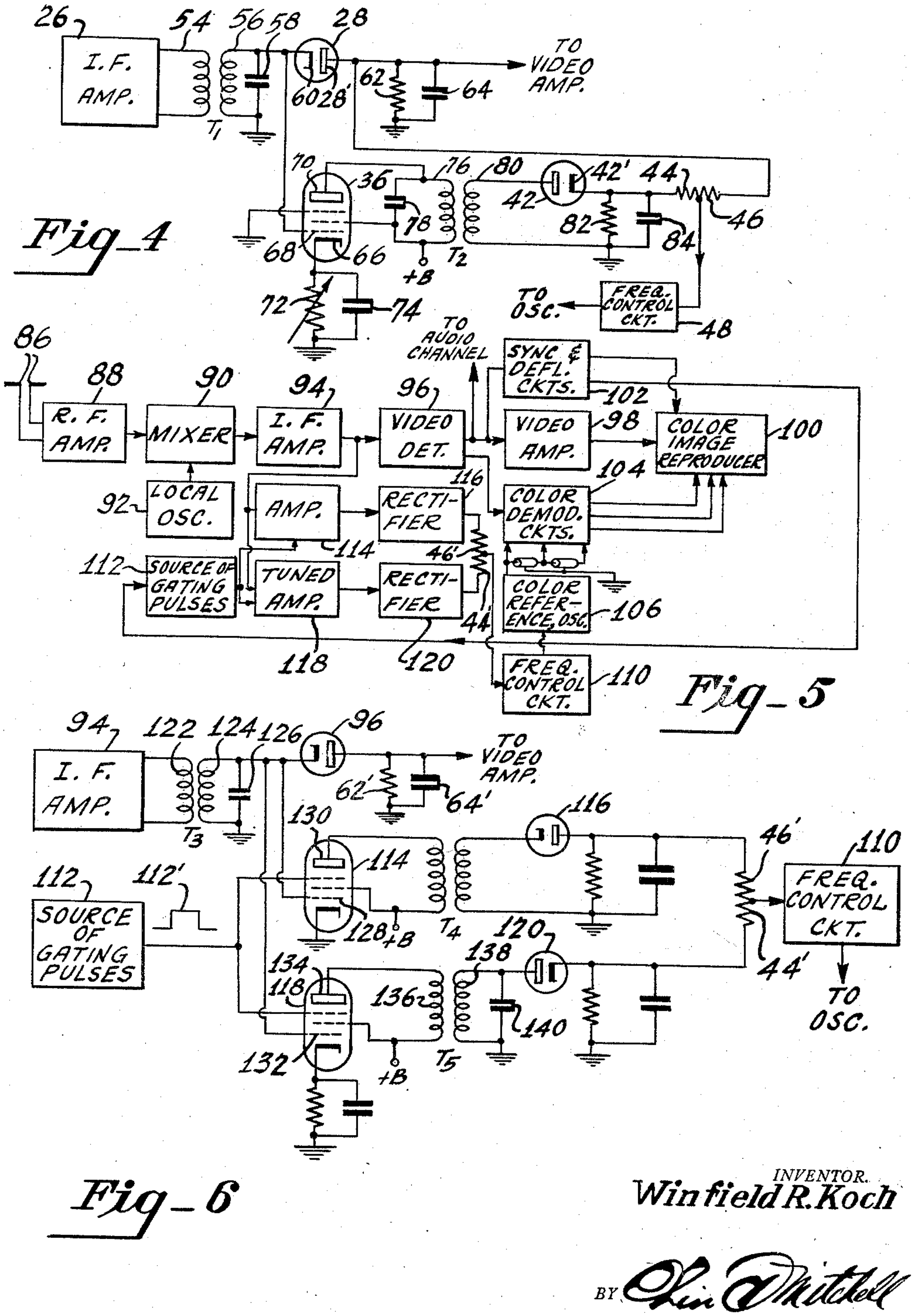
Fig. 4 is a schematic circuit diagram of apparatus embodying the present principles.

Fig. 5 illustrates, by way of block diagram, a form of gated A. F. C. arrangement according to the invention;

Fig. 6 is a schematic diagram illustrating a gated A. F. C. circuit; and

Figures 1, 2:
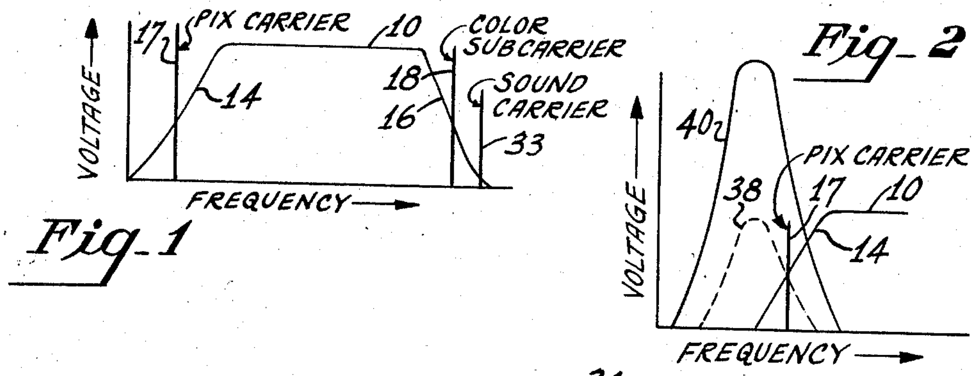
Figures 3, 3A, 7:
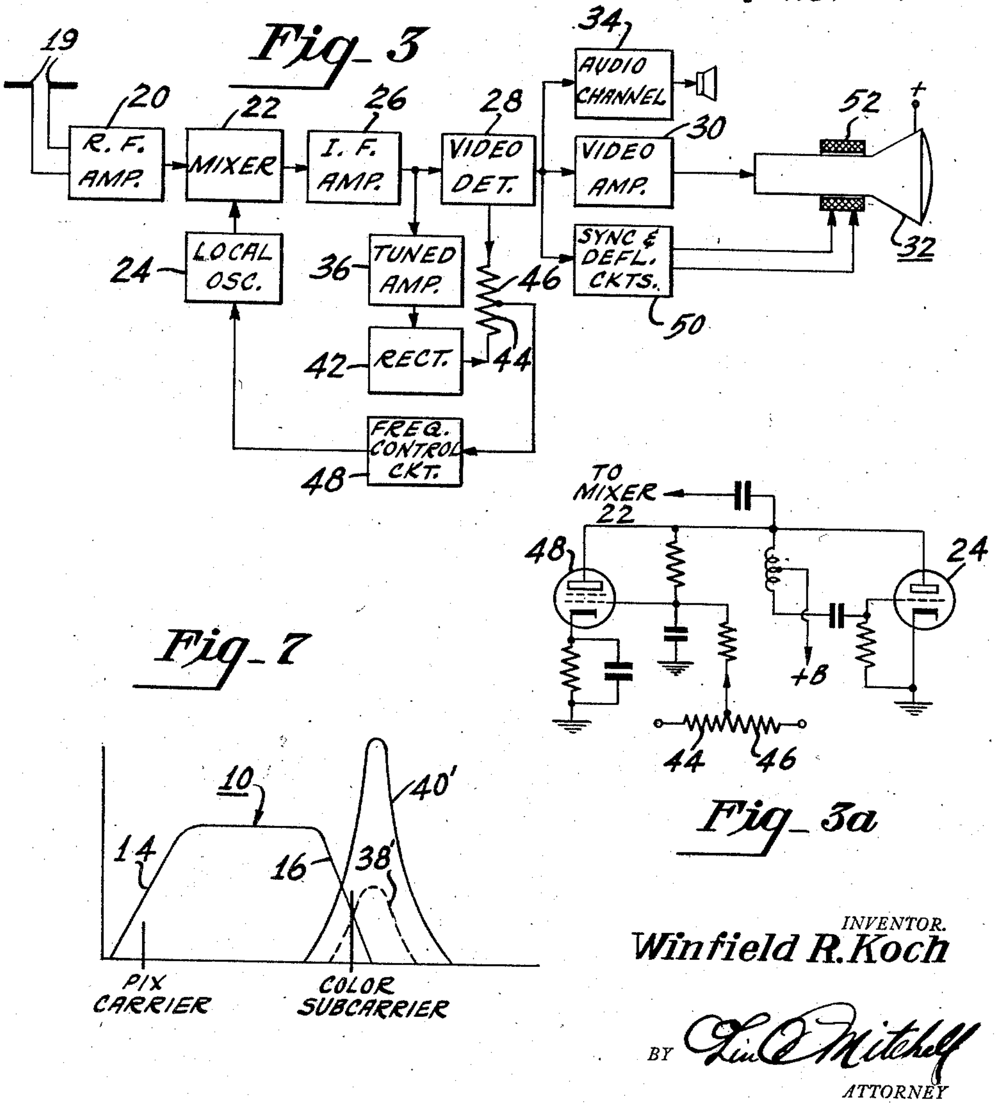
Fig. 3 is a block diagram illustrating the environment of the invention.

Fig. 7 is an illustration similar to that of Fig. 2.

Referring to the drawing and, more particularly, to Fig. 1, thereof, there is shown a response characteristic curve of a conventional monochrome or color television receiver in which signal voltage amplitude is plotted as a function of frequency. Thus, it may be seen that the response characteristic curve 10 has a sloped portion 14 at its lower frequency end and a still more steeply sloped portion 16 at its upper frequency end. The picture carrier wave frequency 17 is indicated as being at substantially the 50 percent amplitude point on the lower frequency end of the curve 10 as is conventional practice in present-day television. The color subcarrier 18 is illustrated as being at substantially the 50 percent amplitude point on the upper frequency end of curve 10. Use of this fact is made in the present invention in a manner which will appear more fully hereinafter.

In the illustration of Fig. 3, there is shown a conventional monochrome television receiver, for example, which receives the amplitude-modulated picture carrier wave via antenna 19. The carrier wave is amplified by a radio frequency amplifier 20 and is applied to a mixer 22 which may take the form of a multi-grid vacuum tube which has applied to another of its electrodes a heterodyning wave furnished by a local oscillator 24. The carrier wave and the output of the oscillator are "beat" in the mixer 22 to produce a lower or intermediate frequency which is applied to I. F. amplifier 26 prior to amplitude-detection by the video detector 28. The picture information thus removed from the I. F. wave is further amplified by video amplifier 30 and applied to the beam-intensity control electrode of an image-reproducing device illustrated as kinescope 32. Sound information is conventionally transmitted by frequency-modulation of an audio carrier wave whose location in the frequency spectrum is indicated at 33 in Fig. 1. The frequency-modulated sound carrier wave is or may be taken from the output of the video detector 28 and applied to the audio channel 34 which may comprise some form of F.-M. detecting means as well as audio amplification stages. In accordance with the present invention as stated supra, the response characteristic of the I. F. stages indicated by block 26 is advantageously exploited to form one part of a frequency discriminating circuit, this being accomplished in generally the folowing manner: The I. F. amplifier 26 and video detector 28 are normally coupled by means of a circuit tuned as shown in Fig. 1. The output of I. F. amplifier 26 is additionally coupled to an auxiliary amplifier indicated as the tuned amplifier 36. This amplifier, in order to function in cooperation with the I. F. amplifier as the other half of a frequency discriminator circuit, must be tuned in a special manner. More specifically, there is reproduced in Fig. 2 a portion of the I. F. selectivity curve 10 showing the sloped lower frequency portion 14. It is desired, for proper operation of a discriminator of the type in question, that the tuned circuit afforded by amplifier 36 have a resonance curve such as that shown by dotted line curve 38 which intersects the I. F. curve portion 14 at the location of the video carrier wave frequency 17. In order to effect such a frequency relationship, the amplifier 36 is designed to have a resonance characteristic such as that indicated by curve 40 which is, as shown, rather highly peaked and which intersects the I. F. curve at a point of higher frequency than the video carrier frequency. By locating the resonance circuit having a response characteristic such as that of curve 40 in the anode circuit of the tuned amplifier 36, and by coupling to its input electrode the I. F. amplifier tuned circuit whose response characteristic is that of curve 14, the product of the two selectivity curves 14 and 40 is substantially that of the dotted line curve 38 which does, in fact, intersect with the I. F. curve at the location of the video carrier.

The tuned amplifier 36 is coupled, in turn, to rectifier 42 whose output circuit includes load resistor 44 which is in series opposition to the load resistor in the output circuit of the video detector 28. Assuming resistors 44 and 46 to be substantially equal in value and that the level of the signals applied to the video detector 28 and rectifier 42 are properly matched, the voltage at the junction of resistors 44 and 46 should be zero for a condition of proper intermediate frequency. The junction of the two resistors 44 and 46 is connected to a frequency control circuit 48 which may, for example, comprise a reactance tube device for varying the frequency of oscillation of the local oscillator 24. Frequency control circuits such as that contemplated are now well known in the art and an example of a reactance tube device may be found in U. S. Patent No. 2,544,311 granted March 6, 1951, to Thomas L. Gottier.

Fig. 3*a* illustrates a portion of the Gottier patent drawing including the Hartley type oscillator 24 and reactance tube 48 which operate in a well-known manner. Still another form of frequency control device is that described and claimed in U. S. Patent No. 2,526,207, granted October 17, 1950, to H. L. Donley et al., which is concerned with a capacitor whose capacitance is readily variable in response to small voltage changes.

Assuming, on the other hand, that the I. F. output varies in frequency from the norm, the voltage at the junction of resistors 44 and 46 will similarly change either positive or negative, depending upon whether the intermediate frequency has increased or decreased from its proper value, and the resulting voltage will be applied to the frequency control circuit 48 for returning the local oscillator frequency to its desired value. A specific circuit for accomplishing the aims of the present invention will be described in connection with Fig. 4. Prior to that discussion, however, and in the interest of completeness of description, it is to be noted that horizontal and vertical synchronizing pulses are removed by suitable separation means coupled to the output of the video detector 28 and are employed to synchronize the horizontal and vertical deflection circuits 50 for controlling the scanning currents flowing in the electromagnetic deflection coils 52.

In the schematic diagram of Fig. 4, there is illustrated the I. F. amplifier 26 whose output circuit includes the primary 54 of a coupling transformer $T_1$. The secondary 56 of this transformer is tuned by capacitor 58 so that its response is that indicated by curve 10 of Fig. 1. The video detector 28 comprises a diode whose cathode 60 is connected to the tuned circuit and whose anode circuit includes a load resistance 62 and a shunt capacitor 64 for bypassing intermediate frequency energy. Also connected to the anode 28' of the video detector 28 is the resistance 46 alluded to earlier. Amplifier 36 is illustrated as being in the form of a pentode having a cathode 66, control electrode 68 and anode 70. The suppressor electrode is connected directly to ground, while the screen electrode is illustrated as being connected to a source of positive potential +B in the usual manner. Connected between the cathode 66 and ground is a variable bias resistor 72 bypassed for high frequency by a capacitor 74. The control electrode 68 of amplifier 36 is connected to the output of the tuned circuit comprising transformer secondary 56 and capacitor 58, while the anode 70 of the amplifier includes the primary winding 76 of a coupling transformer $T_2$. Capacitor 78 in parallel with winding 76 tunes the latter to form a resonant circuit having a response curve such as that shown by the dotted line 40 of Fig. 2. Transformer $T_2$ also includes a secondary winding 80 which couples the tuned circuit 76, 78 to diode rectifier 42 which has a resistor 82 and bypass capacitor 84 in its load circuit. The cathode 42' of rectifier 42 is connected to one end of resistance 44, the other end of which is joined to resistor 46, the junction of the two resistors being connected to the input of frequency control circuit 48.

As described briefly supra, the frequency discriminating action required for proper control of the local oscillator is accomplished by means of two tuned circuits whose response curves intersect at the frequency of the picture or video carrier. One of these tuned circuits comprises the I. F. amplifier 26 while the other tuned circuit (i. e., the one having a response curve 38) is provided in the following manner: the output circuit of amplifier 36 comprising the primary winding 76 of transformer $T_2$ and its tuning capacitor 78 from a resonant circuit whose response or resonance curve is that shown by curve 40 in Fig. 2. Since the input to amplifier 36 via its control electrode 68 is derived from the tuned circuit made up of winding 56 and capacitor 58, a process of multiplication carried out by amplifier 36 results in a condition in which the overall response of the amplifier is equal to that illustrated by dotted line curve 38. In other words, amplifier 36 provides a multiplication in accordance with well known principles such that its effective tuning is different from the specific tuning of its anode circuit.

In view of the foregoing, it will be recognized that the output of the video detector 28 appearing across resistance 46 and the output of rectifier 42 appearing across resistor 44 will be equal and opposite for a condition in which the frequency of the output of the I. F. amplifier 26 is its proper value, so that the signal applied to the frequency control circuit 48 will be zero. When the intermediate frequency drifts to one side of its proper value, one of the diodes 28 and 42 will conduct more heavily than the other diode to produce a finite signal at the junction of the two resistors for application to the frequency control circuit. The gain of amplifier 36 may be varied through the agency of the variable resistor 72 in its cathode circuit in order to produce a corresponding change in the product of the selectivity characteristics. While the variable gain means is shown as operating on the bias of the amplifier, it should be borne in mind that other well known devices for changing the gain of the amplifier may be employed.

In view of the foregoing description of the circuit of Fig. 4, it will be appreciated that the present invention in the form shown provides a simple and improved frequency discriminating arrangement for controlling the frequency of an oscillator in a superheterodyne receiver, only one tuned circuit being added to the circuitry already present in such a receiver. Moreover, by reason of the fact that one of the tuned circuits is the I. F. stage itself, better selectivity is afforded in a simpler manner than that which would be possible with two separate tuned circuits as normally used in the amplitude type frequency discriminator in question.

As has been stated, the present invention is also applicable to a gated arrangement, as for use either in providing a more noise-immune frequency stabilization of a superheterodyne oscillator or for the more specialized use in controlling the frequency of a color reference oscillator in a "subcarrier" type system. An example of a color reference oscillator and reactance tube device may be found in U. S. Patent No. 2,594,280, granted April 29, 1952, to L. E. Barton et al. There is shown in Fig. 5 a block diagram of a color television receiver having an antenna 86 for applying a received composite signal to R.–F. amplifier 88 which, in turn, applies the signal to a mixer 90 which heterodynes the carrier wave with the output of a local oscillator 92 and applies the resulting product to I. F. amplifier 94. The amplified intermediate frequency wave is amplitude detected by the video detector 96 to provide the picture information per se which is amplified by the video frequency amplifier 98 and applied as a luminance or brightness signal to a beam intensity controlling electrode (not shown) in the color image reproducing device 100. Synchronization of the deflection circuits 102 is or may be accomplished in any well known manner. In accordance with the type of color system in question, the color subcarrier wave, which is phase and amplitude modulated in accordance with the hue and saturation, respectively, of the televised image, is selected from the output of the video detector 96 and applied to the color demodulator circuits 104 which may, by way of illustration, comprise synchronous detecting devices. One form of color television receiver to which the invention is applicable, by way of example, is described in detail in an article entitled "Principles of NTSC compatible color television," Electronics, February, 1952, by C. J. Hirsch et al., p. 88. The color demodulator circuits are furnished with several discrete phases of a wave of subcarrier frequency from a color reference oscillator 106 and delay line 108 such that it is extremely important for proper operation of the receiver that the frequency of the reference oscillator be exactly equal to the subcarrier frequency. Thus, there is provided a frequency control circuit 110 which may comprise a reactance tube device for varying its resonant oscillation. Stabilization of a color reference oscillator, in accordance with the proposed system in question is made possible by "bursts" of subcarrier frequency transmitted on the "back porch" of each horizontal blanking pulse (i. e., just after the horizontal sync pulse), this type of signal being described in an article entitled "NTSC color-TV synchronizing signal," by R. B. Dome, appearing in the February, 1952 issue of Electronics, p. 96. In order to select the reference bursts from the balance of the composite received signal, there is provided a source of gating pulses 112 which may, for example, be operated by means of pulses appearing at suitable points in the horizontal deflection circuits indicated within block 102. Since this latter aspect of the apparatus does not constitute a part of the present invention, it need not be described further here beyond noting the fact that there have been several proposals for apparatus capable of gating at the times of occurrence of the color synchronizing bursts. The apparatus of Fig. 5 further includes an amplifier 114 coupled to the output of I. F. amplifier 94 and having associated with it a rectifier 116. Such amplifier 114 should have at least one control electrode to which the output of the I. F. amplifier 94 may be applied and an additional controlling electrode to which gating pulses from source 112 may be applied. Rectifier 116 may, as will appear, comprise a simple diode having a resistance 46′ in its load circuit. Also provided is a tuned amplifier 118 having a resonant circuit in series with its space current path and tuned to have a resonance curve such as that shown by curve 40′ in Fig. 7, which is similar to curve 40 of Fig. 2 except that its center frequency is located beyond the color subcarrier frequency in the spectrum. By multiplication substantially identical to that described in connection with the circuit of Fig. 4, the tuned amplifier 118 provides a net response curve 38′ (Fig. 7) which intersects the sloping I. F. curve portion 16 as shown at the location of the color subcarrier frequency. The output of tuned amplifier 118 is coupled to a rectifier diode 120 which has in its load circuit resistor 44′ in series opposition to resistor 46′. The function of the two resistors is, in turn, connected to the input of the frequency control circuit 110.

Before explaining a specific embodiment of the A. F. C. apparatus capable of gated operation such as that indicated generally in Fig. 5, it should be noted that frequency discrimination is accomplished during only the burst portions of the signal, so that the frequency discriminator is not subject to the undesired influences of the balance of the signal.

Fig. 6 includes the I. F. amplifier 94 of the circuit of Fig. 5, the frequency control circuit 110 and a source of gating pulses 112. The I. F. amplifier 94 includes in its output circuit the primary winding 122 of an output transformer $T_3$ whose secondary 124 is tuned by capacitor 126 to form a tank circuit having the I. F. response curve 10 (Fig. 7). Video detector 96 is connected to the upper terminal of the capacitor 126 and includes a load resistor 62′ and bypass capacitor 64′. Amplifier 114 is a pentode whose control electrode 128 is connected to the upper terminal of capacitor 126 and whose anode 130 is connected to a source of positive potential +B through the primary winding of a transformer $T_4$. The secondary winding of transformer $T_4$ is coupled to the cathode of a rectifier diode 116 whose anode is, in turn, connected to one end of resistor 46′. As thus far described, it should be apparent that the response characteristic of the circuit including amplifier 114 and transformer $T_4$ is substantially identical to that of the resonant circuit comprising elements 124 and 126.

Also connected to the upper terminal of capacitor 126 is the control electrode 132 of amplifier 118 whose anode 134 is connected to +B through the primary winding 136 of transformer $T_5$. The secondary winding 138 of the transformer is tuned by means of capacitor 140 to have a response or resonance curve such as that shown by curve 40' in Fig. 7. From the foregoing explanation, it will be recognized that the product of response curve 40' and I. F. curve 16 will comprise the dotted line curve 38'. The upper terminal of capacitor 140 is connected to the anode of a rectifier diode 120 whose cathode is connected to one end of a resistor 44', the other end of which joins resistor 46'. The junction of the two resistors 44' and 46' is connected to the input of frequency control circuit 110. In the operation of the circuit of Fig. 6 amplifier 114 and diode rectifier 116 perform substantially the function of the I. F. amplifier 26 and video detector 28 of Fig. 4, insofar as affording a tuned circuit is concerned. Amplifier 118, however, in conjunction with its tuned circuit 138, 140 and diode rectifier 120 serves in the same capacity as tuned amplifier 36 of Fig. 4, namely, that of providing a cooperating resonance characteristic for forming the second half of the frequency discriminator. Positive pulses 112', produced by source 112, are applied simultaneously to the suppressor electrodes of amplifiers 114 and 118 to render them conductive during the occurrence of the color subcarrier bursts, at which time the rectifiers 116 and 120 detect the amplitude of the waves applied to them via transformer $T_4$ and $T_5$, respectively, in their frequency discriminating action. Since the slope 16 of the I. F. selectivity curve 10 is steeper at its color subcarrier frequency end than at its picture carrier end 14, the A. F. C. action of the circuit of Fig. 6 is extremely accurate. By varying the gain of amplifier 18, the balance of the discriminator may be changed in frequency, which is useful in adjusting the operating point of the apparatus, both from the standpoint of producing the best possible color picture and affecting the signal to noise ratio in weak signal areas.

While the present invention has been described in accordance with its various aspects in conjunction with specific circuits embodying its principles, it should be borne in mind that various changes and modifications of the circuitry may be made without departing from its scope.

Having thus described my invention, what I claim as new and desire to secure by Letters Patent is:

1. Automatic frequency control apparatus for a superheterodyne receiver including a source of frequency to be controlled and an intermediate frequency amplifier having an output and a non-linear frequency response characteristic such that said frequency to be controlled is located at a predetermined point on a sloping portion of said non-linear characteristic, which apparatus comprises: a first rectifier means; means coupling the output of said intermediate frequency amplifier to said rectifier means in such manner that the amplitude of signals applied to said detector varies as a function of frequency in accordance with said non-linear characteristic; means including a resonant circuit whose response curve intersects said sloping portion of said characteristic; means coupling said last-named means to said output of said intermediate frequency amplifier: a second rectifier means; means coupling said second rectifier means to said resonant circuit; and voltage-comparison means connecting said first and second rectifier means; and means coupled to said voltage comparison means for controlling said source of frequency.

2. Apparatus as defined by claim 1 wherein said means including a resonant circuit comprises an electronic amplifier.

3. Apparatus as defined by claim 1 including means for sharply tuning said resonant circuit such that the amplitude-frequency response at the input of said second rectifier means intersects said non-linear intermediate frequency amplifier frequency response characteristic at substantially said frequency of said source.

4. Apparatus as defined by claim 1 wherein said means including a resonant circuit comprises an electronic amplifier having an input and an output circuit, said resonant circuit being coupled to said output circuit; and means for varying the gain of said amplifier.

5. Apparatus as defined by claim 1 wherein said means coupling the output of said intermediate frequency amplifier to said first rectifier means comprises an electronic device having a conduction-controlling electrode and wherein said means including a resonant circuit comprises an electronic device having a conduction-controlling electrode; a source of gating pulses; and means for coupling said source to both of said conduction-controlling electrodes.

6. Apparatus as defined by claim 1 wherein said receiver comprises a television receiver and said first rectifier means comprises its video detector means.

7. In combination with a superheterodyne receiver including an oscillator whose frequency is to be controlled and an intermediate frequency amplifier comprising a tuned circuit having a non-linear frequency response characteristic such that a frequency having a predetermined relationship to said oscillator frequency is located at a predetermined point on a slope thereof, automatic frequency control apparatus comprising: a first rectifier means coupled to the output of said intermediate frequency amplifier; a second rectifier means; means for coupling said second rectifier means to the output of said intermediate frequency amplifier means, comprising an electronic device having input and output circuits, said input circuit being coupled to said intermediate frequency amplifier output and said output circuit including a parallel inductance-capacitance resonant circuit whose frequency response characteristic intersects said intermediate frequency amplifier response characteristic at the location of said frequency having a predetermined relationship to said oscillator frequency; means coupling said resonant circuit to said second rectifier means; voltage-comparison means connected to said first and second rectifier means for deriving a control voltage for said oscillator, and means coupling said voltage comparison means and said oscillator for controlling the frequency of said oscillator in accordance with said control voltage.

8. The invention as defined by claim 7 wherein each of said rectifier means comprises a diode having an output terminal and wherein said voltage-comparison network comprises resistive means connecting said output terminals of said diodes.

9. The invention as defined by claim 7 wherein said electronic device comprises an amplifier and including means for varying its gain such as to change the intersection point of said amplitude-frequency response characteristic at the input of said second rectifier means and said intermediate frequency amplifier frequency response characteristic.

10. In a superheterodyne receiver including an oscillator having a nominal frequency, an intermediate frequency amplifier, a diode detector and means including a resonant circuit coupling the output of said amplifier to the input of said detector such the amplitude-vs.-frequency response at the input of said detector is a non-linear characteristic on a sloped portion of which a frequency having a predetermined relationship to said nominal frequency is located, automatic frequency control apparatus for determining deviation of said oscillator frequency from said nominal frequency, which comprises: a diode rectifier having a load resistor, means coupling the input of said detector to the input of said rectifier; a second rectifier having a load resistor in series opposition to said first-named load resistor; means including a resonant circuit whose center frequency is displaced from said frequency having a predetermined relationship to said nominal frequency for coupling the input of said detector to the input of said second rectifier, the amplitude-versus-frequency-response characteristic at the input of said second rectifier having a slope substantially opposite from that of said sloped portion of said non-linear characteristic in the region of said frequency having a predetermined relationship to said nominal frequency; and means coupled to said load resistors and to said oscillator for controlling said nominal frequency.

11. The invention as defined by claim 10 wherein said last-named means comprises an amplifier whose gain is such that the product of said amplitude-vs.-frequency response at the input of said detector and the resonance curve of said last-named tuned circuit comprises a characteristic curve which intersects said first-named response-characteristic at substantially said frequency having a predetermined relationship to said nominal frequency.

12. Automatic frequency control apparatus for a superheterodyne receiver including a source of signal frequency to be controlled and a signal processing channel for delivering signals from said source to a utilization circuit, said channel having a non-linear amplitude-frequency response characteristic such that said frequency to be controlled is located on a sloping portion of said characteristic, said apparatus comprising; a tuned circuit connected to receive signals from said source and having an amplitude-frequency response characteristic which intersects said characteristic of said channel at the nominal location of said frequency to be controlled and with opposite slope; means for detecting the relative amplitude of signals passed by said channel and by said tuned circuit, and means responsive and said last-named means for controlling said signal frequency.

References Cited in the file of this patent

UNITED STATES PATENTS

| | | |
|---|---|---|
| 2,296,092 | Crosby | Sept. 15, 1942 |
| 2,586,190 | Wasmansdorf | Feb. 19, 1952 |
| 2,622,146 | Sontheimer | Dec. 16, 1952 |
| 2,664,464 | Cotsworth | Dec. 29, 1953 |